United States Patent [19]

Gurevich et al.

[11] 4,163,163

[45] Jul. 31, 1979

[54] NON-SALIENT POLE SYNCHRONOUS ELECTRIC GENERATOR

[76] Inventors: Elrikh I. Gurevich, prospekt Kosmonavtov, 50 korpus 4, kv. 72; Iosif F. Filippov, Pulkovskaya ulitsa, 17, kv. 39; Igor A. Prigorovsky, ulitsa Basseinaya, 53, kv. 4; Garri M. Khutoretsky, ulitsa Altaiskaya, 20, kv. 5, all of Leningrad; Alexandr I. Vorontsov, ulitsa Khazova, 43, kv. 94, Leningrad-Pushkin, all of U.S.S.R.

[21] Appl. No.: 674,216

[22] Filed: Apr. 6, 1976

[51] Int. Cl.² .............................................. H02K 9/00
[52] U.S. Cl. ........................................ 310/59; 310/62; 310/64
[58] Field of Search ...................... 310/52, 53, 55, 56, 310/57, 58, 59, 60, 64, 65, 62

[56] References Cited

U.S. PATENT DOCUMENTS

| | | | |
|---|---|---|---|
| 1,938,078 | 12/1933 | Lysholm | 310/57 |
| 1,944,107 | 1/1934 | Reist | 310/57 |
| 2,573,383 | 10/1951 | Beckwith | 310/57 |
| 2,707,243 | 4/1955 | Baudry | 310/64 |
| 2,915,655 | 12/1959 | Baudry | 310/55 |
| 2,920,218 | 1/1960 | Beckwith | 310/64 |
| 3,505,546 | 4/1970 | Victor | 310/55 |
| 3,571,635 | 3/1971 | Turner | 310/59 |

Primary Examiner—R. Skudy
Attorney, Agent, or Firm—Lackenbach, Lilling & Siegel

[57] ABSTRACT

An electric generator includes a rotor, a stator, a frame, a core with radial channels, and a winding, the space between the frame and the external surface of the core being divided by radial partitions into an even number of sections communicating with one another in pairs. The first section in each pair communicates along the gas flow path with the gas coolers located in the frame in close proximity to the core faces and arranged to admit the gas flow into the radial channels of the core while the second section in each pair communicates along the gas flow path with the inlet depression zone of the fans installed on the rotor faces and is arranged to discharge the gas flow from the radial channels of the core to the fans whose pressure zone communicates along the gas flow path with the gas cooler inlet.

6 Claims, 4 Drawing Figures

NON-SALIENT POLE SYNCHRONOUS ELECTRIC GENERATOR

The present invention relates to electric machines and more particularly it relates to gas-cooled non-salient pole synchronous generators (turbogenerators) used in industrial power engineering systems, particularly in thermal electric stations.

Known in the prior art are non-salient pole synchronous electric generators with gas-cooled active parts, viz., rotor winding and stator core, wherein the cooling gas (mostly hydrogen) is circulated by fans through the radial channels of the stator and enters the air gap between the stator and rotor for cooling the rotor winding.

The increase in the specific power of generators and specific current loads places heavy demands on the parameters of the gas cooling system. For example, it becomes necessary to ensure intensive movement of gas in the radial channels of the stator core at a low degree of heating of said gas in the gap between the stator and rotor, thus ensuring uniform and efficient cooling of all the active parts of the generator.

Also known in the prior art are gas-cooled non-salient pole synchronous electric generators wherein the gas flow circulates within the active volume of the generator in radial and tangential directions relative to the rotation axis of the rotor.

The known non-salient pole synchronous electric generator comprises a rotor whose shaft carries fans at the ends, which fans produce depression and pressure zones, and a stator consisting of a frame with built-in gas coolers, and a core. In the active zone the rotor is provided with slots accommodating a field winding. The stator core is fitted around the rotor consists of several stacks assembled from circular laminations, said stacks accommodating the stator winding whose end connections are secured at the core faces.

The stacks of the stator core are separated from one another by radial spacers whose surfaces form, together with the surfaces of the stacks, ventilation channels for the flow of the cooling gas in a radial direction.

The gap between the rotor and the stator core is separated along the gas flow from the depression zone of the fans and the zone of end connections of the stator winding by circular partitions located in close proximity to the core faces whereas the space between the frame and the external surface of the core is divided by radial partitions into an even number of sections which communicate in pairs with each other along the gas flow through the gap.

The first section in each pair admits the gas flow and the second one discharges it from the core channels under the effect of the fans in order to ensure gas cooling of the active zone and the face zone of the stator core including the end connections of the stator winding.

In the known generator the gas cooler inlet communicates along the gas flow with the outlet sections of the space between the frame and the external surface of the stator core while the gas cooler outlet communicates with the depression zones of the fans, the cooling gas flowing from the gas coolers to the active zone being heated by the thermal energy produced in the fans and in the face zone of the stator.

A substantial disadvantage of the known non-salient pole electric generator lies in that the temperature of the gas discharged from the coolers and passing through the depression zone of the fans and the end face zone of the stator becomes considerably higher at the entrance into the active zone than at the outlet from the gas coolers which limits the efficiency of cooling of the stator core and rotor winding.

The prior art constructions, therefore, make it impossible to lower the temperature of the active parts at a given level of generator electromagnetic loads and, likewise make it impossible to raise the loads at a fixed permissible temperature of the stator core and the rotor winding.

An object of the invention is to provide a non-salient pole synchronous electric generator whose operational reliability is improved due to more efficient cooling of its active part.

Another object of the invention is to provide a generator whose weight and size are smaller than those of the known generators at a given permissible temperature of its active part.

A further object of the invention is to provide such a cooling system of the non-salient synchronous electric generator which would permit raising its electromagnetic loads at a fixed permissible temperature of the stator core and rotor winding.

In accordance with these and other objects the essence of the present invention relates to a non-salient pole synchronous electric generator comprising a rotor with fans producing depression and pressure zones, and a stator consisting of a frame with gas coolers, a core fitted around the rotor and consisting of stacks with radial channels, and a stator winding with end connections secured at the core faces, also has circular partitions located in close proximity to the core faces and arranged to separate the gap between the rotor and stator core along the gas flow from the fan depression zones. The space between the frame and the external surface of the stator core is divided by radial partitions into an even number of sections communicating in pairs with each other along the gas flow path through the gap between the rotor and the stator core. The first section in each pair of sections admits the gas flow into the core channels while the second one discharges said gas flow under the effect of the fans from the core channels in order to ensure gas cooling of the active zone and the zone of end connections and, according to the invention, the inlet of the gas coolers is connected directly along the gas flow with the fan, the outlet from the gas coolers communicates with the first section of each pair of sections and each fan communicates with the outlet from the second section of each pair of sections through the zone of the end connections of the stator winding.

The non-salient pole synchronous electric generator according to the invention features a higher operational reliability and, which is no less important, smaller weight and size at the given level of permissible temperatures in its active zone.

This is accomplished by improving the efficiency of gas cooling since the active zone of this generator is cooled by non-heated gas discharged directly from the gas coolers.

Thus, the temperature of the active parts, i.e. stator core and rotor winding, is reduced at a given level of generator electromagnetic loads so that said loads can be raised at a certain permissible temperature in the active zone.

Other objects and advantages of the present invention will become apparent from the description of an embodiment of the invention with reference to the accompanying drawings in which.

Let us now consider the non-salient pole synchronous electric generator, by way of example, of a turbogenerator with a hydrogen-cooled rotor and stator core.

Figure 1:
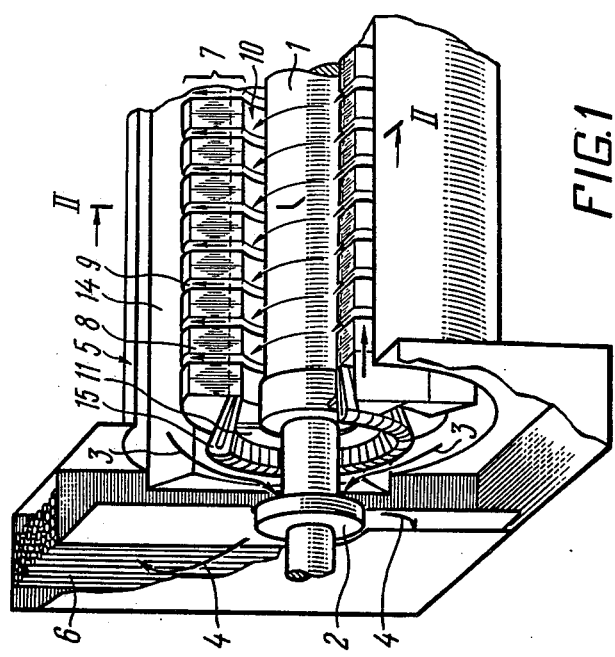
FIG. 1 is a perspective view of the non-salient pole synchronous electric generator according to the invention partially broken away to show the interior construction thereof, the arrows showing the direction of cooling gas flow.

Such a turbogenerator is shown partly in FIG. 1 (the other part of the generator is symmetrical to that illustrated in the drawing).

Both ends of the rotor 1 carry fans 2 which produce a depression zone at their inlets and a pressure zone at the outlets. The entrance of the gas flow into, and its discharge from, the fan 2 are shown by arrows 3 and 4, respectively.

The stator frame 5 is provided with built-in tubular gas coolers 6, the inlet hole of the frame space accommodating the gas coolers 6 being located in close proximity to the outlet pressure zone of the fan 2 which allows the gas flow to move from the fan 2 directly into the gas coolers 6 as shown by arrow 4.

The stator core 7 arranged around the rotor 1 consists of stacks 8 of steel laminations provided with radial ventilation channels 9.

The core 7 is separated from the rotor 1 by an air gap 10 which is closed at the faces of the rotor 1 by circular partitions 11 which separate the air gap 10 along the gas flow path from the depression zone of the fan 2.

The space between the stator frame 5 and the external surface of the stator core 7 (FIG. 2) is divided by radial partitions 14 into an even number of sections 12 and 13. In this particular example there are four sections, two sections 12 and two sections 13.

The sections 13 are the drawout ones, communicating along the gas flow with the depression zones of the fans 2 (FIG. 1) while the sections 12 (FIG. 2) are the pressure ones, communicating directly with the outlet from the gas coolers 6 (FIG. 1).

Figure 3:
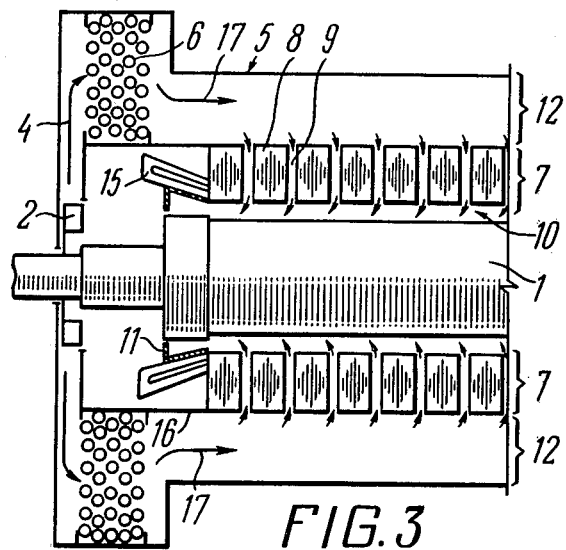
FIG. 3 is a longitudinal section of the non-salient pole synchronous electric generator according to the invention, taken along line III—III in FIG. 2.

Shown in FIG. 3 is a sectionalized view of the generator through the section 12 where it is seen clearly that the section 12 located between the frame 5 and the external surface of the core 7 communicates along the gas flow path with the outlet from the gas coolers 6 shown sectionalized.

Figure 4:
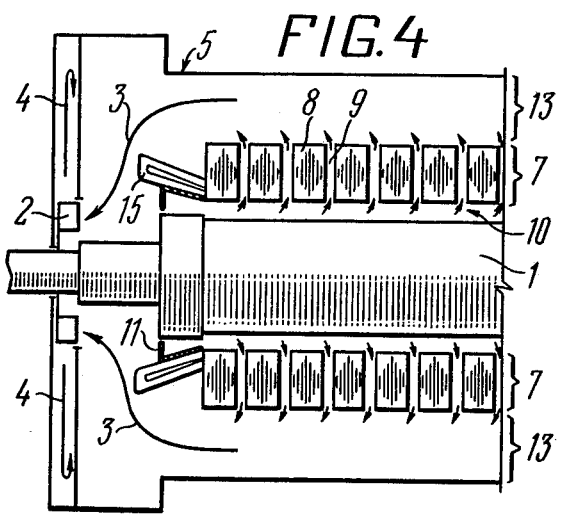
FIG. 4 is similar to FIG. 3 but is a section taken along line IV—IV in FIG. 2.

FIG. 4 is a sectionalized view of the generator through the section 13 where it can be seen that the section 13 located between the stator frame 5 and the external surface of the core 7 communicates along the gas flow (arrow 3) with the inlet depression zone of the fan 2 shown sectionalized.

To separate the sections 12 and 13 (FIG. 2) along the gas flow, the face zone (the zone of end connections 15 (FIG. 3) of the stator winding) has face partitions 16 which serve as extensions of the sections 13 (FIG. 2) and protrude beyond the active zone of the generator.

These partitions 16 (FIG. 3) protect the sections 12 against the ingress of gas heated in the active zone and entering the inlet of the fan 2.

The non-salient pole synchronous electric generator according to the invention operates as follows.

As the rotor 1 and fans 2 rotate, the gas heated by the losses in the active zone is discharged by the fans 2 from the face zones of the stator (arrow 3, FIG. 1) and forced into the gas coolers 6 (arrow 4).

Being cooled to a certain temperature, the gas flows from the gas coolers 6 (FIG. 3), as shown by arrow 17, directly into the sections 12 between the stator frame 5 and the external surface of the core 7.

Figure 2:
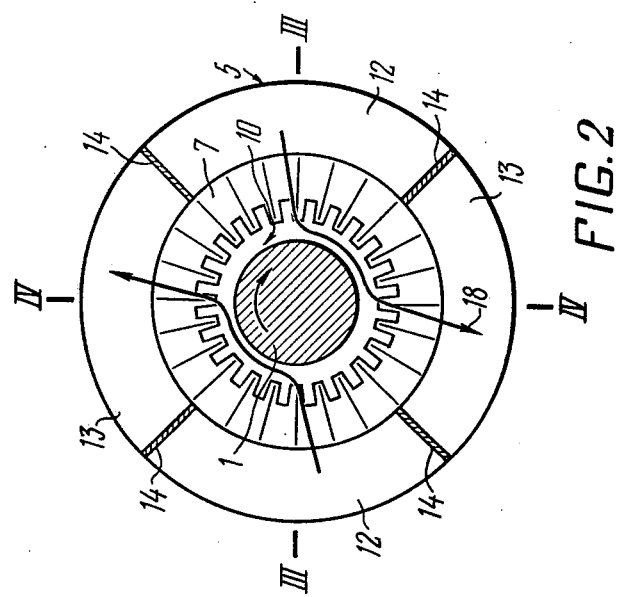
FIG. 2 is a cross section of the non-salient pole synchronous electric generator according to the invention, taken along line II—II in FIG. 1.

Then the cooling gas flows through the radial channels 9, abstracting heat from the stacks 8 of the stator core 7 and enters the gap 10 between the rotor 1 and the stator core 7 (FIG. 2).

Within the limits of the section 12 the cooling gas moves in the air gap 10 tangentially as shown by arrow 18, and receives heat from the rotor 1.

Being moved by the revolving rotor 1, the gas flow enters the space of the adjacent section 13 through the radial channels 9 between the stacks 8 of the core 7 and cools said core in this space.

Entering the section 13 between the external surface of the core 7 and the stator frame 5, the gas flow moves along the arrow 3 in FIG. 4 into the zone of the end connections 15 of the stator winding, cools this zone and approaches the inlet depression zone of the fan 2.

From here the gas flow is again forced into the gas cooler 6 (arrow 4 in FIG. 1) and the cooling cycle of the generator active zone is repeated over again.

The rotor 1 is cooled additionally with gas by the conventional system of self-ventilation from the air gap through air intakes.

This direct supply of cold gas from the gas coolers 6 to the pressure sections 12 (FIG. 2) with simultaneous removal of the heated gas from the drawout sections 13 through the face zone rules out the influence of gas heating in the face zone and in the fans 2 on the temperature of the rotor 1 and stator core 7.

The non-salient synchronous generator with this system of gas cooling ensures the best conditions for cooling the active zone under which the minimum temperature of the rotor 1 and stator core 7 is uniformly distributed throughout the length of the generator.

Besides, this type of cooling improves the operational reliability of the generator, diminishes its weight and size at a given permissible temperature and if it is necessary to raise its electromagnetic loads.

The non-salient pole synchronous electric generator according to the invention can be used extensively and efficiently in industrial power engineering systems.

We claim:

1. A non-salient pole synchronous electric generator comprising: a stator having a frame and a core mounted thereon; a rotor; fans installed on the end faces of said rotor and arranged to produce depression and pressure zones during operation; gas coolers having an inlet and an outlet and accommodated in said frame in close proximity to said fans and communicating with said pressure zone, said core of said stator being fitted around said rotor and made of stacks with radial channels therebetween, said rotor and the internal surface of said stator core being spaced from each other to form an air gap therebetween; circular partitions installed in said air gap in close proximity to said end faces of said stator core for separating said air gap along the gas flow path from said depression zone of said fans, said frame and the external surface of said stator core being spaced from each other and forming a space therebetween; radial partitions dividing said space into an even number of sections, said sections communicating in pairs with each other along the gas flow path through said air gap, the first section of each pair of communicating sections being arranged to introduce the gas flow into said radial channels of said core and communicating with the outlet from said gas coolers, the second section of each pair of communicating sections being arranged to discharge the gas flow from said radial channels of said core to said fans and communicating with said depression zone of said fans.

2. A generator as defined in claim 1, wherein said stator has end connections secured to the end faces of said stator core.

3. A generator as defined in claim 2, wherein said second section is arranged to discharge the gas flow through the region of said end connections of said stator winding.

4. A generator as defined in claim 1, wherein said stacks are made of steel laminations.

5. A generator as defined in claim 1, wherein four sections are arranged to provide two pairs of diametrically opposing sections, one of said pairs comprising said first sections, and the other of said pairs comprising said second sections.

6. A generator as defined in claim 1, wherein said gas coolers are tubular gas coolers.

* * * * *